United States Patent
Zinaty et al.

(10) Patent No.: US 8,463,968 B2
(45) Date of Patent: Jun. 11, 2013

(54) MECHANISM FOR A SHARED SERIAL PERIPHERAL INTERFACE

(75) Inventors: Amir Zinaty, Haifa (IL); Adit Tarmaster, Folsom, CA (US); Michael Derr, El Dorado Hills, CA (US); Haim Lustig, Zichron-Yaakov (IL)

(73) Assignee: Intel Corporation, Santa Clara, CA (US)

(*) Notice: Subject to any disclaimer, the term of this patent is extended or adjusted under 35 U.S.C. 154(b) by 1299 days.

(21) Appl. No.: 11/096,941

(22) Filed: Mar. 31, 2005

(65) Prior Publication Data
US 2006/0224803 A1    Oct. 5, 2006

(51) Int. Cl.
G06F 13/00      (2006.01)
G06F 13/36      (2006.01)
G06F 13/362     (2006.01)

(52) U.S. Cl.
USPC ............................ 710/113; 710/107; 710/110

(58) Field of Classification Search
USPC ................ 710/8, 14, 105–107, 110, 113, 119
See application file for complete search history.

(56) References Cited

U.S. PATENT DOCUMENTS

| | | | | |
|---|---|---|---|---|
| 5,270,898 A * | 12/1993 | Elms et al. | ........................ | 361/96 |
| 6,009,488 A | 12/1999 | Kavipurapu | | |
| 6,938,164 B1 * | 8/2005 | England et al. | ................ | 713/193 |
| 2003/0009654 A1 * | 1/2003 | Nalawadi et al. | .................. | 713/1 |
| 2003/0154336 A1 * | 8/2003 | Ballantyne et al. | ............ | 710/110 |
| 2006/0184717 A1 * | 8/2006 | Rothman et al. | ............... | 711/103 |

OTHER PUBLICATIONS

Kalinsky, David et al. "Introduction to Serial Peripheral Interface". Feb. 1, 2002. Embedded Systems Design. Retrieved from Internet Apr. 16, 2008. <http://embedded.com/columns/beginerscorner/9900483?printable=true>.*
"512 Kbit SPI Serial Flash". SST25VF512. Silicon Storage Technology, Inc. Nov. 2005. (Original Release May 2001). pp. 1-23.*
"8Mbit, Low Voltage, Serial Flash Memory With 40Mhz SPI Bus Interface". M25P80. ST Microelectronics. Aug. 2004 (Initial Release Apr. 2002). pp. 1-41.*
The Free On-Line Dictionary of Computing. Entry 'chip set'. Online Mar. 27, 1995. Retrieved from Internet Aug. 12, 2009. <http://foldoc.org/chipset>.*

* cited by examiner

*Primary Examiner* — Thomas J Cleary
(74) *Attorney, Agent, or Firm* — Blakely, Sokoloff, Taylor & Zafman LLP

(57) ABSTRACT

According to one embodiment, a computer system is disclosed. The computer system includes a flash memory device, a serial peripheral interface (SPI) coupled to the flash memory device, a network controller coupled to the SPI; and a chipset coupled to the SPI. The chipset includes an arbiter to arbitrate between the network controller and the chipset for control of the SPI to access the flash memory device.

16 Claims, 4 Drawing Sheets

MECHANISM FOR A SHARED SERIAL PERIPHERAL INTERFACE

FIELD OF THE INVENTION

The present invention relates to computer systems; more particularly, the present invention relates to sharing interfaces at a computer system.

BACKGROUND

Computer system chipsets typically include one are more components that are implemented to provide an interface to input/output (I/O) devices within the computer system. Such devices include a network controller, a hard disk drive, one or memory devices, etc. coupled to the chipset via various types of interfaces.

One interface used to couple I/O devices to the chipset is a serial peripheral interface (SPI). The SPI is an interface that enables the full duplex, serial exchange of data between two devices, a master and a slave. However, a problem with the SPI is that only one master/slave pair may be coupled. Therefore, if a device (e.g., a flash memory device) is coupled to the chipset via SPI, all accesses to the flash memory device must be through the chipset.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A mechanism for a shared SPI interface is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
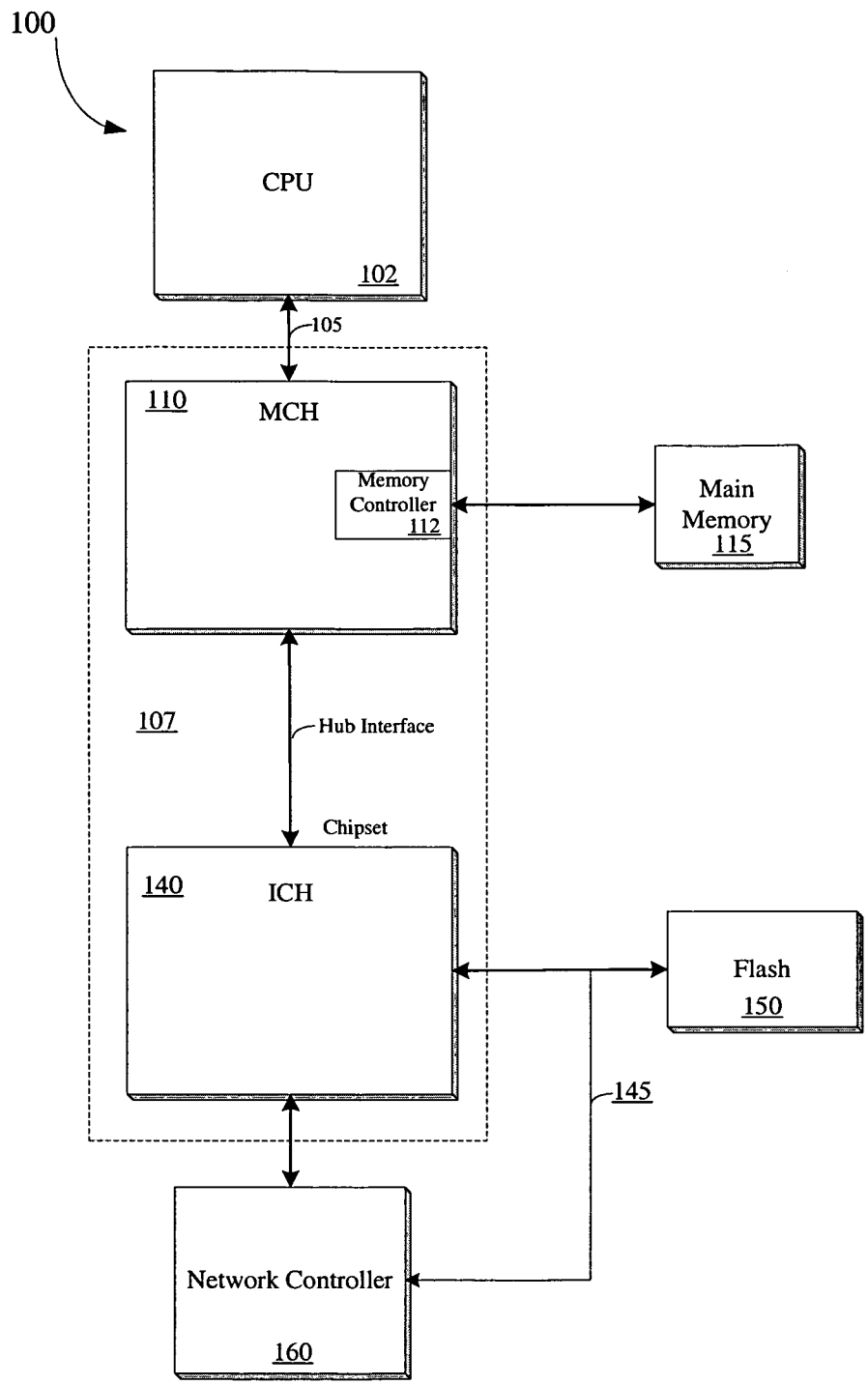
FIG. 1 is a block diagram of one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented using multiple processing cores. In yet other embodiments, computer system 100 may include multiple CPUs 102

In a further embodiment, a chipset 107 is also coupled to interface 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, a flash memory device 150 and network controller 160 are coupled to ICH 140. In such an embodiment, network controller 160 is coupled to ICH 140 via a Peripheral Component Interface Express (PCI-X) interface. In addition, network controller 160 is also coupled to flash 150.

In one embodiment, both ICH 140 and network controller 160 are coupled to access flash 150 via a shared SPI interface 145. Thus, SPI 145 enables immediate access of flash 150 to ICH 140 and network controller 160. ICH 140 may access flash 150 to retrieve data for CPU 102. For example, BIOS may access flash 150 at boot time, as well as during run time. In one embodiment, ICH 140 implements a Request/Grant protocol to CPU 102. Network controller 160 may access flash 150 to retrieve control information to facilitate management of network connections.

According to one embodiment, ICH 140 and network controller 160 operate at different frequencies. For instance, ICH 140 may be targeted to operate at 17.8M Hz, while network controller 160 is targeted to operate at 15.6M Hz (& 6.25M Hz). In a further, bus arbitration and signaling between ICH 140 and network controller 160 are carried out using standard SPI signals, with the addition of a dedicated Bus-Request signal (as will be described below).

Figure 2:
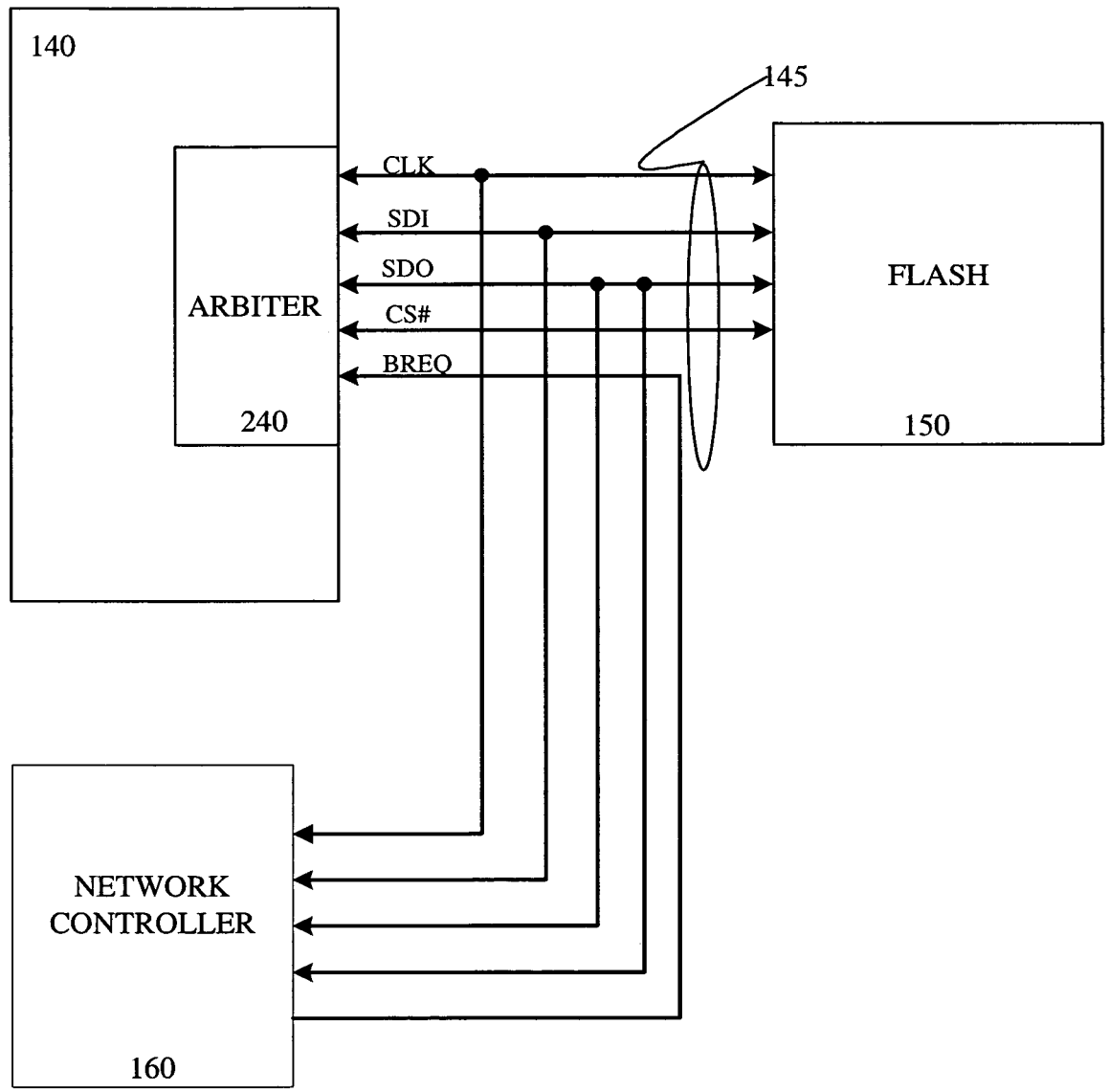
FIG. 2 illustrates one embodiment of devices coupled via a shared SPI interface.

FIG. 2 illustrates one embodiment of a shared SPI 145 coupling ICH 140 and network controller 160 to flash 150. According to one embodiment, ICH 140 includes an arbiter 240 to control access to flash 150 via SPI 145. Arbiter 240 controls access to flash 150 by arbitrating access requests between ICH 140 and network controller 160.

As discussed above, SPI 145 includes standard SPI signals (e.g., CLK, SDI, SDO and CS#), as well as a bus request signal (BREQ). The CLK signal is driven by both ICH 140 and network controller 160 when running a SPI master cycle. This signal is implemented to grant future request to ICH 140. The SDI signal is driven by both ICH 140 and network controller 160 when running an SPI master cycle. This signal is implemented to signal a future request from ICH 140.

The SDO signal is driven by flash 150 whenever an SPI cycle is in progress. The CS# signal is driven by both ICH 140 and network controller 160 when running a SPI master cycle. The CS# signal serves as an implicit grant from ICH 140 to network controller 160. The BREQ signal is a dedicated signal driven by network controller 160. According to one embodiment, network controller 160 drives the BREQ signal low whenever there is no request, and drives the signal high for a request. The BREQ signal remains high until network controller 160 relinquishes the interface.

Arbitration between ICH 140 and network controller 160 for control of SPI 145 follows the below-described rules. First, since ICH includes arbiter 240, network controller 160 defaults the interface to ICH 140. Both ICH 140 and network controller 160 may initiate short accesses to flash 150 at any time. Short accesses are flash accesses that terminate at the SPI 145 cycle completion.

For long accesses (e.g., access that does not end at the SPI cycle completion) the SPI 145 owner polls flash 150 status until the access is completed. At that time the interface may be released to other requests. Very long accesses are accesses that last are longer than allowed to stall the CPU 102. In one embodiment, network controller 160 avoids very long accesses when network controller 160 senses SPI-Request signaling from CPU 102.

Non Blocking Arbitration indicates that ICH 140 and network controller 160 will avoid back-to-back cycles unless to avoid SPI bus starvation. Stand Alone indicates that both devices may operate as stand alone devices. For BIOS accesses to flash 145, CPU 102 will not experience long latencies accessing flash 145 due to interface arbitration with network controller 160.

Further, arbitrary CPU accesses to flash 145 may collide with network controller 160, presenting potential long arbitration latencies. However, the Request/Grant protocol described above is implemented to avoid these long arbitration latencies. According to one embodiment, CPU 102 accesses flash 145 as a plain memory device without control signaling following a CPU 102 reset.

During run time (and advanced boot phase) the BIOS sets a SPI-Request flag and wait for SPI-Grant prior to any access (e.g., read & write). The SPI request is reflected to network controller 160. When the SPI-Request is reflected to network controller 160, bus holding duration is minimized to avoid long latency to CPU 102.

Table 1 below illustrates exemplary network controller 160 accesses to flash 145. Particularly, Table 1 shows network controller 160 cycles to flash 145 based upon a type of access. Thus, access types following power on reset, boot time and nominal operation (e.g., No Future Request and Future Request) is shown.

embodiment, memory controller 112 is included within CPU 102, with memory 115 being coupled to CPU 102.

The above-described mechanism enables a new connection type for the SPI interface from one master to multiple slave devices, or from multiple masters talking with the same slave. Expanding the protocol to multiple masters talking with multiple slaves is also foreseeable based upon the disclosure.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A chipset comprising:
an input/output (I/O) control component, coupled to a serial peripheral interface (SPI), having an arbiter to arbitrate for control of a slave device between the I/O control component and a master device, the arbiter implementing pins defined in the SPI standard coupled between the arbiter, the master device and the slave device and a bus request signal pin coupled between the chipset and the master device to enable the master device to request control of the SPI from the arbiter, wherein a SDI pin of the SPI is implemented to indicate to the master device a future request from the I/O control component.

2. The chipset of claim 1 wherein a CS# pin of the SPI is implemented to grant control of the slave device to the master device.

3. The chipset of claim 2 wherein a CLK pin of the SPI is implemented to grant the future request from the I/O control component.

4. The chipset of claim 1 wherein the master device drives the request signal pin low when there is no request to control the SPI.

5. The chipset of claim 4 wherein the master device drives the request signal high to request to control of the SPI.

TABLE 1

| Access Type | Following POR | Boot time PCI de-assertion (Future Request is set) | Nominal operation (No Future Request) | Nominal operation (Future Request is set) |
|---|---|---|---|---|
| Read Config content | Always executed | — | almost ever | almost ever |
| Update Config content | — | — | very infrequent | gated |
| Read DMA & Cache (up to 128B) | MNG activity | Limited BW for good BIOS load | no limitations | no limitations |
| DMA Write (up to 256B) | MNG/SW | gated | no limitations | gated |
| Erase | MNG/SW | gated | no limitations | gated |

Figure 3:
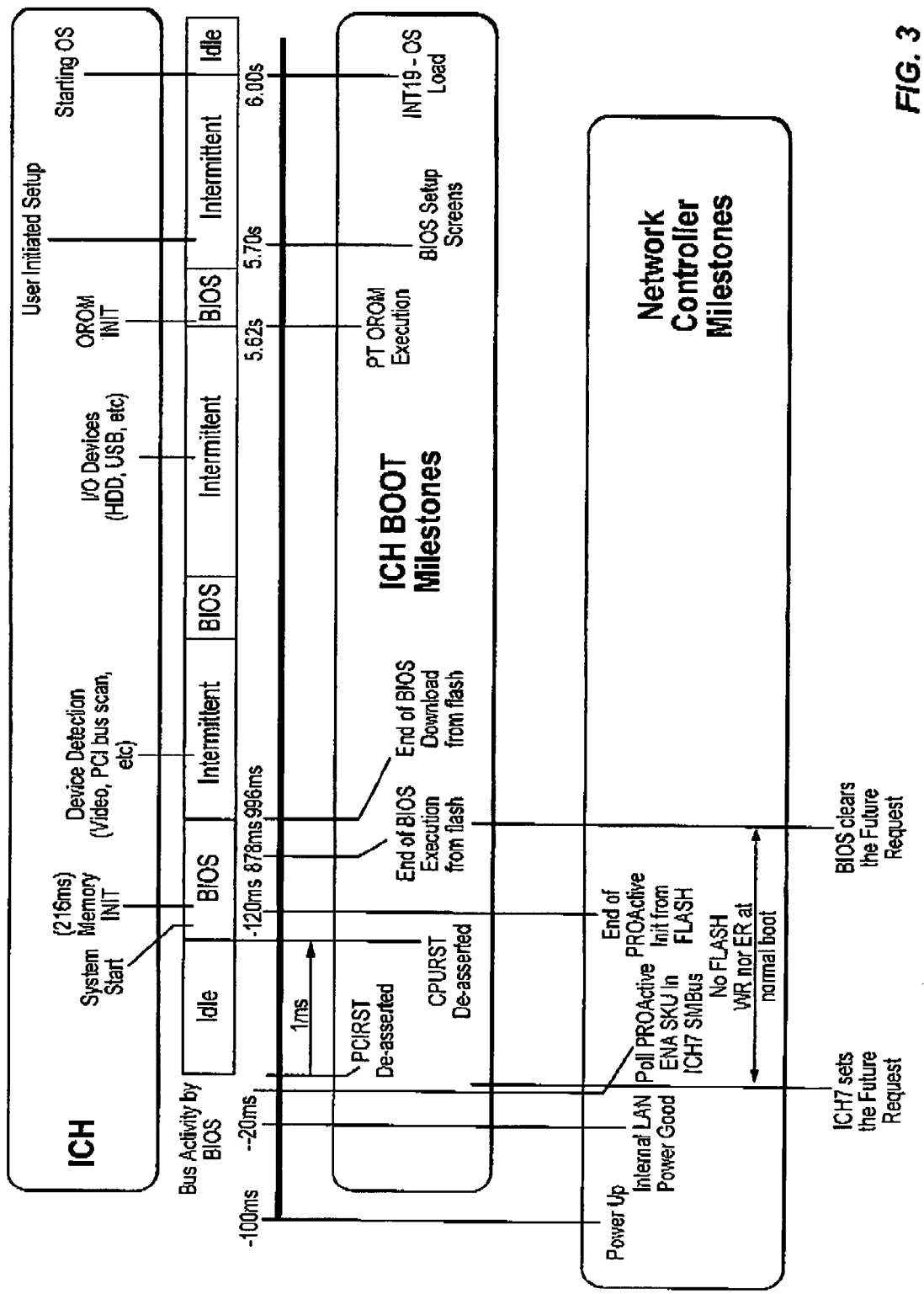
FIG. 3 is a timing diagram of one embodiment of a computer system boot process.

FIG. 3 is a timing diagram for one embodiment of a power on reset boot sequence. The top box in FIG. 3 shows the state of ICH 140 with respect to a timeline. The box below represents interface 145 activity by BIOS. The bottom two boxes show ICH 140 boot and network controller 160 boot milestones, respectively.

Figure 4:
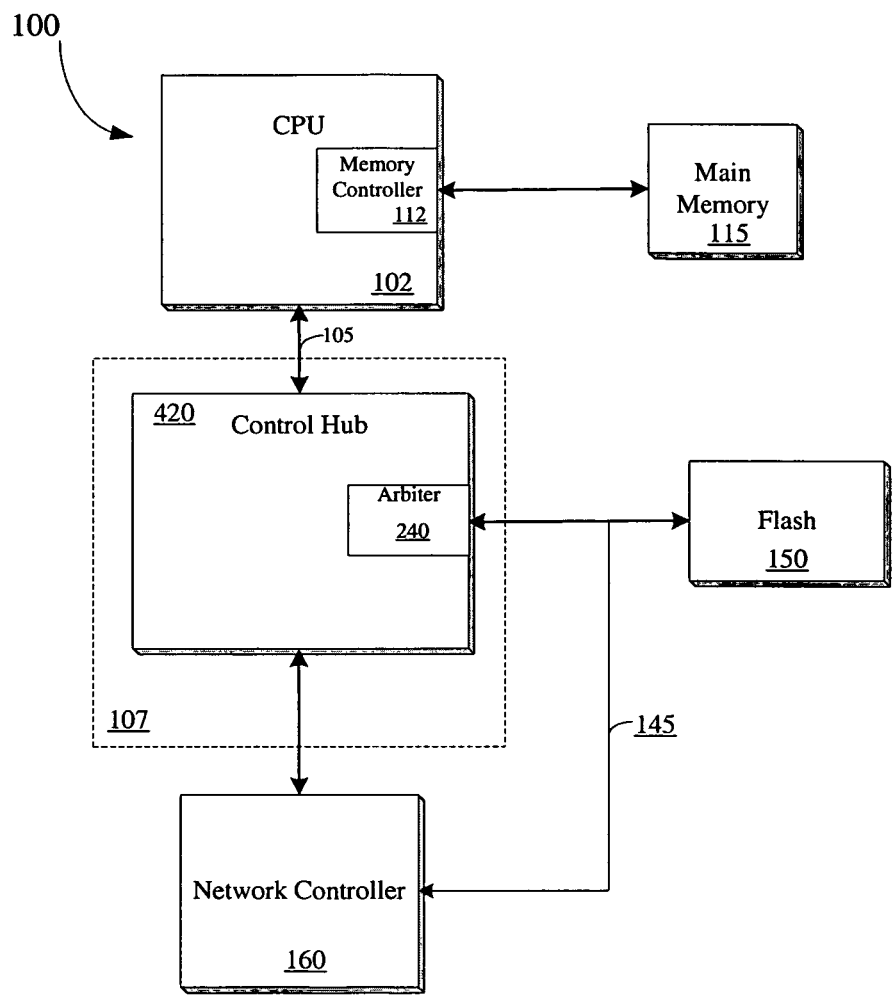
FIG. 4 is a block diagram of another embodiment of a computer system.

FIG. 4 illustrates another embodiment of computer system 100. In this embodiment, chipset 107 includes a single control hub 420 as opposed to a separate MCH and ICH. Consequently, arbiter 240 is within control hub 420. Also in this 6. A computer system comprising:
a flash memory device;
a serial peripheral interface (SPI) coupled to the flash memory device;
a network interface controller (NIC) coupled to the SPI; and
a chipset, coupled to the SPI, having an arbiter to arbitrate between the network interface controller and the chipset for control of the SPI to access the flash memory device, the SPI including pins defined in the SPI standard coupled between the chipset, the NIC and the flash memory device and a bus request signal pin coupled between the chipset and the NIC to enable the NIC to request control of the SPI from the arbiter, wherein a SDI pin of the SPI is implemented to indicate to the master device a future request from the I/O control component.

7. The chipset of claim 6 wherein a CS# pin of the SPI is implemented to grant control of the slave device to the master device.

8. The chipset of claim 7 wherein a CLK pin of the SPI is implemented to grant the future request from the I/O control component.

9. The computer system of claim 6 further comprising a central processing unit coupled to the chipset.

10. The computer system of claim 6 wherein the chipset comprises an input/output control hub (ICH) coupled to the SPI.

11. The computer system of claim 10 wherein the arbiter is included within the ICH.

12. The computer system of claim 10 wherein the ICH accesses the flash memory device to retrieve basic input output system (BIOS) data.

13. The computer system of claim 12 wherein the network interface controller accesses the flash memory device to retrieve management information.

14. The computer system of claim 6 wherein the network interface controller drives the request signal pin low when there is no request to control the SPI.

15. The computer system of claim 14 wherein the network interface controller drives the request signal high to request to control of the SPI.

16. The computer system of claim 15 wherein the request signal remains high until the network interface controller relinquishes control of the SPI.

* * * * *